No. 634,225. Patented Oct. 3, 1899.
J. F. WILSON.
WORK HOLDER FOR PLANING, MILLING, OR DRILLING.
(Application filed Dec. 9, 1898.)
(No Model.)
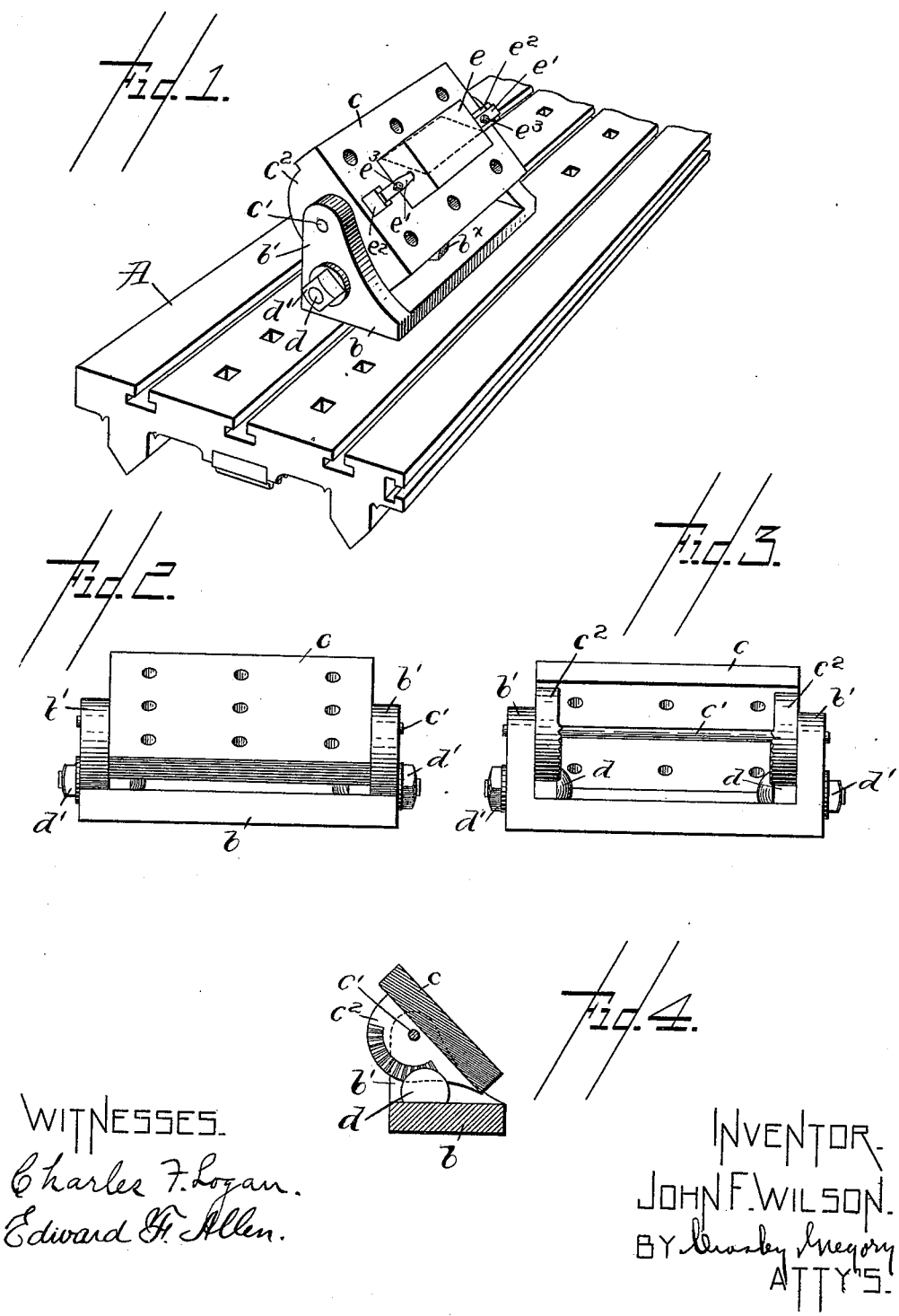
WITNESSES.
Charles F. Logan.
Edward H. Allen.
INVENTOR.
JOHN F. WILSON.
BY Crosby Gregory
ATTY'S.

UNITED STATES PATENT OFFICE.

JOHN F. WILSON, OF MILFORD, MASSACHUSETTS.

WORK-HOLDER FOR PLANING, MILLING, OR DRILLING.

SPECIFICATION forming part of Letters Patent No. 634,225, dated October 3, 1899.

Application filed December 9, 1898. Serial No. 698,718. (No model.)

*To all whom it may concern:*

Be it known that I, JOHN F. WILSON, of Milford, county of Worcester, State of Massachusetts, have invented an Improvement in Work-Holders for Planing, Drilling, or Milling Machines, of which the following description, in connection with the accompanying drawings, is a specification, like letters on the drawings representing like parts.

In machine-shop work it is frequently necessary to plane a casting to present an inclined or beveled face or surface and also to drill holes at an angle to the surface of the casting or material in which a hole is to be made and also to mill a piece of metal and leave an angular face or cut. To do this angular work, it is now customary to use what is known in machine-shops as an "angle-iron," it presenting a foot to rest on the bed of the planing, drilling, or milling machine, said foot having extended upwardly from it a rigid side usually at right angles to the foot, but sometimes angular, and the work to be acted upon is secured to this side. When the work is to be planed or drilled at a particular angle, it is customary to apply the work to this planed side and then to put between the planed side and the work shims or wedges until the work is placed at exactly the proper angle and then the work and shims are locked in place. This shimming up of the work requires very considerable time and requires a skilled laborer to do it properly.

I have aimed to provide a novel holder or angle-iron which may be instantly adjusted to any desired angular position with relation to the bed of the planer or other machine, according to the requirements of the work to be done.

My improved holder consists, essentially, of a base, herein shown as having suitable uprights on or with relation to which I pivotally mount a work-holding platen, and I have combined with said base and platen means for positively locking said platen in any adjusted position. This platen may have several usual holes to receive bolts used in connection with the clamping straps or devices.

Figure 1 of the drawings shows in perspective one of my improved work-holders applied to the bed of a planer, a piece of work being held in place on the platen. Fig. 2 is an enlarged front elevation of the work-holder detached. Fig. 3 is a rear view of the work-holder shown in Fig. 2. Fig. 4 is a detail to be described.

The bed A is and may be supposed to be a part of any usual planing-machine bed or the bed of any usual drilling or milling machine. This bed serves as a support for the base $b$ of my improved work-holder, said base being confined to the bed by suitable bolts $b$. This base has, as herein shown, rising from each end of it suitable uprights $b'$, between or to which is suitably mounted, so that it may tip on or with relation to said base, a work-holding platen $c$. The platen is herein shown as pivotally mounted upon a rod $c'$, having its ends mounted in uprights $b'$ $b'$, the said rod passing along the under side of the platen and through ears $c^2$ thereof extended therefrom. The ears $c^2$ perform a further useful function—that is, they serve as surfaces against which may act suitable locking devices, herein shown as headed bolts $d$, having nuts $d'$, said bolts being extended through said uprights from their inner sides, leaving the flanges of the heads of the bolts free to act against said ears, the nuts when turned up on said bolts causing the heads to engage the said ears and hold said platen in any adjusted angular position in order that the work may be presented to the tool to act upon it at the required angle.

This invention is not, however, limited to the employment of locking devices just such as shown, and instead I may use any other suitable or well-known equivalent devices.

The platen is represented as provided with a series of holes in usual manner, and they may be more or less in number and at any desired distance apart, said holes in practice receiving bolts or clamps which aid in clamping the work firmly on the base of the platen, as shown in Fig. 1. The work $e$ has suitable holes at its ends which receive the ends of planer-straps $e'$, the outer ends of said straps resting on suitable blocks $e^2$, lying on the platen, while the straps between their ends are acted upon by bolts $e^3$, extended through the holes in the platen, and by turning the nuts on these bolts the work may be held more or less closely against the top of the platen.

The inner faces of the ears $c^2$ and the inner sides of the bolt-heads, constituting the locking devices, may be scored or serrated, as shown in the detail, Fig. 4, illustrating the ears so serrated, such serrations providing notches against which the projections of the bolt may enter and absolutely prevent any turning of the platen.

Having described my invention, what I claim as new, and desire to secure by Letters Patent, is—

1. A work-holder for use in connection with metal-working machines, consisting of a base provided with uprights, a platen having depending ears at its ends, one of which is notched, a pivot supported between and by said uprights, and located to support the platen for angular adjustment, a bolt mounted upon an upright and adapted to enter one of the notches of said ear and provided with a nut adapted to hold the bolt with the projection in said notch.

2. A work-holder consisting of a base provided with uprights, a platen having at its ends depending ears, a horizontal pivot supported in said uprights and about which the said platen may be tipped as desired, said platen supporting the work to be acted upon, a sliding locking device carried by said base, said locking device having a projection to enter notches made in the depending ears of the platen, substantially as described.

In testimony whereof I have signed my name to this specification in the presence of two subscribing witnesses.

JOHN F. WILSON.

Witnesses:
GEO. W. GREGORY,
MARGARET A. DUNN.